(12) United States Patent
Jang et al.

(10) Patent No.: US 6,674,287 B2
(45) Date of Patent: Jan. 6, 2004

(54) METHOD FOR GROUPING UNIT CELLS USING PATTERN MATCHING TECHNOLOGY OF IMPEDANCE SPECTRUM

(75) Inventors: Jee-Hwan Jang, Daejeon (KR); Hyun-Kyung Sung, Daejeon (KR); Sang-Hyo Ryu, Daejeon (KR)

(73) Assignee: Korea Kumho Petrochemical Co. Ltd., Seoul (KR)

( * ) Notice: Subject to any disclaimer, the term of this patent is extended or adjusted under 35 U.S.C. 154(b) by 0 days.

(21) Appl. No.: 10/208,608

(22) Filed: Jul. 30, 2002

(65) Prior Publication Data

US 2003/0052689 A1 Mar. 20, 2003

(30) Foreign Application Priority Data

Sep. 20, 2001 (KR) ........................................ 2001-58211

(51) Int. Cl.[7] ............................................. G01N 27/416
(52) U.S. Cl. ....................................... 324/430; 324/434
(58) Field of Search .................................. 324/426, 430, 324/431, 434; 320/116, 117, 110, 106

(56) References Cited

U.S. PATENT DOCUMENTS

| | | | |
|---|---|---|---|
| 3,808,487 A | 4/1974 | Feuillade | |
| 3,873,911 A | 3/1975 | Champlin | |
| 3,984,762 A | 10/1976 | Dowgiallo, Jr. | |
| 4,259,639 A | 3/1981 | Renirie | |
| 4,743,855 A | 5/1988 | Randin et al. | |
| 5,241,275 A | 8/1993 | Fang | |
| 6,118,275 A | 9/2000 | Yoon et al. | |
| 6,160,382 A | * 12/2000 | Yoon et al. | |
| 6,208,147 B1 | 3/2001 | Yoon et al. | |

FOREIGN PATENT DOCUMENTS

EP 0119547 9/1984

* cited by examiner

*Primary Examiner*—Edward H. Tso
(74) *Attorney, Agent, or Firm*—Davidson, Davidson & Kappel, LLC (57) ABSTRACT

A method for grouping unit cells of a similar impedance spectrum uses pattern matching technology to optimize the performance of a battery pack made of primary or secondary batteries as the unit cells connected in series, in parallel or in combination of them. To make an optimal battery pack with unit cells of a different internal characteristic, the method includes measuring the impedance spectrum of the individual unit cell in a wide frequency region at the same temperature and in the same state of charge (SOC), digitizing the difference in impedance spectrum among the unit cells into a relative value using the pattern matching technology, and selecting unit cells of a most similar impedance spectrum (i.e., a smallest relative difference in impedance spectrum) to make a battery pack.

12 Claims, 8 Drawing Sheets

| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
|---|---|---|---|---|---|---|---|---|---|---|---|---|---|---|---|---|---|---|---|---|---|---|---|---|---|
| 1 | | | | | | | | | | | | | | | | | | | | | | | | | |
| 2 | | | | | | | | | | | | | | | | | | | | | | | | | |
| 3 | | | | | | | | | | | | | | | | | | | | | | | | | |
| 4 | | | | | | | | | | | | | | | | | | | | | | | | | |
| 5 | | | | | | | | | | | | | | | | | | | | | | | | | |
| 6 | | | | | | | | | | | | | | | | | | | | | | | | | |
| 7 | | | | | | | | | | | | | | | | | | | | | | | | | |
| 8 | | | | | | | | | | | | | | | | | | | | | | | | | |
| 9 | | | | | | | | | | | | | | | | | | | | | | | | | |
| 10 | | | | | | | | | | | | | | | | | | | | | | | | | |
| 11 | | | | | | | | | | | | | | | | | | | | | | | | | |
| 12 | | | | | | | | | | | | | | | | | | | | | | | | | |
| 13 | | | | | | | | | | | | | | | | | | | | | | | | | |
| 14 | | | | | | | | | | | | | | | | | | | | | | | | | |
| 15 | | | | | | | | | | | | | | | | | | | | | | | | | |
| 16 | | | | | | | | | | | | | | | | | | | | | | | | | |
| 17 | | | | | | | | | | | | | | | | | | | | | | | | | |
| 18 | | | | | | | | | | | | | | | | | | | | | | | | | |
| 19 | | | | | | | | | | | | | | | | | | | | | | | | | |
| 20 | | | | | | | | | | | | | | | | | | | | | | | | | |
| 21 | | | | | | | | | | | | | | | | | | | | | | | | | |
| 22 | | | | | | | | | | | | | | | | | | | | | | | | | |
| 23 | | | | | | | | | | | | | | | | | | | | | | | | | |
| 24 | | | | | | | | | | | | | | | | | | | | | | | | | |
| 25 | | | | | | | | | | | | | | | | | | | | | | | | | |
| 26 | 0.000 | | | | | | | | | | | | | | | | | | | | | | | | |
| 27 | 0.037 | 0.000 | | | | | | | | | | | | | | | | | | | | | | | |
| 28 | 0.075 | 0.109 | 0.000 | | | | | | | | | | | | | | | | | | | | | | |
| 29 | 0.042 | 0.020 | 0.107 | 0.000 | | | | | | | | | | | | | | | | | | | | | |
| 30 | 0.030 | 0.012 | 0.102 | 0.024 | 0.000 | | | | | | | | | | | | | | | | | | | | |
| 31 | 0.123 | 0.158 | 0.050 | 0.156 | 0.150 | 0.000 | | | | | | | | | | | | | | | | | | | |
| 32 | 0.024 | 0.033 | 0.082 | 0.027 | 0.027 | 0.131 | 0.000 | | | | | | | | | | | | | | | | | | |
| 33 | 0.181 | 0.217 | 0.112 | 0.217 | 0.209 | 0.064 | 0.192 | 0.000 | | | | | | | | | | | | | | | | | |
| 34 | 0.014 | 0.044 | 0.067 | 0.047 | 0.037 | 0.115 | 0.026 | 0.173 | 0.000 | | | | | | | | | | | | | | | | |
| 35 | 0.033 | 0.065 | 0.049 | 0.066 | 0.058 | 0.095 | 0.042 | 0.155 | 0.021 | 0.000 | | | | | | | | | | | | | | | |
| 36 | 0.028 | 0.029 | 0.089 | 0.022 | 0.029 | 0.138 | 0.017 | 0.199 | 0.033 | 0.049 | 0.000 | | | | | | | | | | | | | | |
| 37 | 0.115 | 0.150 | 0.042 | 0.148 | 0.142 | ■ | 0.123 | 0.071 | 0.107 | 0.088 | 0.130 | 0.000 | | | | | | | | | | | | | |
| 38 | 0.024 | 0.030 | 0.087 | 0.027 | 0.027 | 0.136 | 0.016 | 0.196 | 0.031 | 0.048 | 0.014 | 0.128 | 0.000 | | | | | | | | | | | | |
| 39 | ■ | 0.038 | 0.074 | 0.041 | 0.031 | 0.122 | 0.022 | 0.181 | 0.012 | 0.030 | 0.031 | 0.114 | 0.029 | 0.000 | | | | | | | | | | | |
| 40 | 0.077 | 0.111 | 0.021 | 0.112 | 0.104 | 0.050 | 0.087 | 0.107 | 0.067 | 0.048 | 0.094 | 0.043 | 0.092 | 0.075 | 0.000 | | | | | | | | | | |
| 41 | 0.030 | 0.015 | 0.101 | ■ | 0.008 | 0.149 | 0.028 | 0.208 | 0.038 | 0.059 | 0.031 | 0.142 | 0.027 | 0.032 | 0.104 | 0.000 | | | | | | | | | |
| 42 | 0.021 | 0.023 | 0.090 | 0.028 | 0.020 | 0.138 | 0.022 | 0.197 | 0.025 | 0.044 | 0.021 | 0.130 | 0.022 | 0.020 | 0.091 | 0.023 | 0.000 | | | | | | | | |
| 43 | 0.103 | 0.138 | ■ | 0.130 | 0.130 | 0.029 | 0.114 | 0.080 | 0.094 | 0.076 | 0.118 | 0.024 | 0.118 | 0.102 | 0.029 | 0.130 | 0.118 | 0.000 | | | | | | | |
| 44 | 0.114 | 0.149 | 0.042 | 0.147 | 0.141 | 0.015 | 0.122 | 0.073 | 0.106 | 0.087 | 0.130 | 0.010 | 0.126 | 0.113 | 0.044 | 0.140 | 0.129 | 0.025 | 0.000 | | | | | | |
| 45 | 0.024 | 0.047 | 0.065 | 0.044 | 0.040 | 0.141 | 0.018 | 0.175 | 0.021 | 0.030 | 0.029 | 0.106 | 0.027 | 0.021 | 0.071 | 0.041 | 0.032 | 0.098 | 0.105 | 0.000 | | | | | |
| 46 | 0.175 | 0.210 | 0.102 | 0.209 | 0.202 | 0.040 | 0.183 | ■ | 0.167 | 0.148 | 0.191 | 0.061 | 0.188 | 0.174 | 0.101 | 0.202 | 0.191 | 0.075 | 0.063 | 0.167 | 0.000 | | | | |
| 47 | 0.033 | 0.065 | 0.047 | 0.063 | 0.057 | 0.053 | 0.037 | 0.157 | 0.028 | 0.024 | 0.046 | 0.087 | 0.042 | 0.033 | 0.054 | 0.056 | 0.048 | 0.079 | 0.086 | 0.021 | 0.148 | 0.000 | | | |
| 48 | 0.027 | ■ | 0.099 | 0.028 | 0.008 | 0.147 | 0.027 | 0.206 | 0.035 | 0.056 | 0.029 | 0.139 | 0.024 | 0.029 | 0.101 | 0.005 | 0.021 | 0.127 | 0.038 | 0.199 | 0.054 | 0.000 | | | |
| 49 | 0.029 | 0.015 | 0.101 | 0.023 | 0.006 | 0.150 | 0.026 | 0.209 | 0.037 | 0.057 | 0.031 | 0.142 | 0.024 | 0.031 | 0.103 | 0.008 | 0.019 | 0.130 | 0.040 | 0.202 | 0.056 | 0.008 | 0.000 | | |
| 50 | 0.027 | 0.060 | 0.053 | 0.063 | 0.054 | 0.100 | 0.040 | 0.158 | ■ | 0.018 | 0.045 | 0.092 | 0.043 | 0.028 | 0.052 | 0.054 | 0.040 | 0.080 | 0.091 | 0.029 | 0.152 | 0.024 | 0.052 | 0.053 | 0.000 |

METHOD FOR GROUPING UNIT CELLS USING PATTERN MATCHING TECHNOLOGY OF IMPEDANCE SPECTRUM

BACKGROUND OF THE INVENTION

1. Field of the Invention

The present invention relates to a method for grouping unit cells to make a battery pack of good performance and, more particularly, to a method for grouping unit cells of a similar impedance spectrum using pattern matching technology to optimize the performance of a battery pack made of primary or secondary batteries as the unit cells connected in series, in parallel or in combination.

2. Related Prior Art

As well known in the art, it is desirable for the good performance of a battery pack to select unit cells of a similar characteristic in the manufacture of the battery pack with unit cells connected in series, in parallel, or in combination of them. But the general method of evaluating a battery pack based on the initial capacity is unsatisfactory for securing the similarity for the unit cells of the battery pack, because the unit cells of the same capacity may be different from one another in aging speed and internal characteristic, such as impedance spectrum.

In the manufacture of a battery pack with a plurality of unit cells connected in series, in parallel or in combination of them, the battery pack can have an enhanced performance when the unit cells have a most similar impedance spectrum representing the internal characteristic. Contrarily, the battery pack, if built with unit cells of a different impedance spectrum, may have a deterioration of capacity or a high aging speed due to the difference in internal characteristic among the unit cells.

Until now, the measurement of impedance has been adapted to sort out defective unit cells. For example, the measurement of impedance at a fixed frequency for a short time of less than one second, as disclosed in U.S. Pat. No. 3,873,911, can be employed for detection of unit cells having a lower capacity than the average value. But the measurement of impedance at a fixed high frequency cannot always predict the accurate capacity of the unit cells. This is because the individual unit cells have a different tendency to increase the impedance in the low frequency region, which means that the unit cell of high impedance at 1 kHz may exhibit a low impedance value in the low frequency region.

The method of selecting unit cells to make a battery pack based on the measurement of open circuit voltage may also present erroneous results, because the open circuit voltage does not represent the accurate internal characteristic of the unit cells and varies insensitively according to the discharge state of the unit cells.

For quality control of the batteries to sort out defective batteries, there have been many methods proposed for analyzing the impedance spectrum of batteries. These methods are based on the measurement of dynamic resistance at a fixed frequency (U.S. Pat. No. 3,873,911); variations of voltage and capacity during a discharge (European Patent No. 0119547); response signals fed back from a battery upon applying a charging signal (U.S. Pat. No. 3,808,487); difference of phase angle between AC voltage across the battery and AC current applied to the battery (U.S. Pat. No. 3,984,762); the measurement of internal resistance of lithium-iodine batteries (U.S. Pat. No. 4,259,639); difference of argument between impedance values measured at two different frequencies (U.S. Pat. No. 4,743,855); the measurement of angle built by straight line between impedance points at several frequencies in Real vs. Imaginary part plot (Nyquist plot) (U.S. Pat. No. 5,241,275); and the analysis of parameters obtained by fitting impedance spectrum to an equivalent circuit model (U.S. Pat. No. 6,208,147).

These conventional methods have the same problem in that only a part of information regarding the internal characteristics of the battery obtained from the measurement can be used for the selection of batteries in such a simple way as to determine the quality of the battery as "good" or "defective". As disclosed in U.S. Pat. No., 6,118,275, for example, the voltage response to current pulse measured for one second with 1 millisecond sampling rate has information about impedance at five different frequencies. Impedance of each frequency has its own unique information about the system. However, only one frequency is used for correlation in the prior art, and the other information is lost.

As described above, the method for analyzing the internal characteristic of batteries by fitting the impedance spectrum to a physically appropriate equivalent circuit model or separation of the impedance measurements into a capacitance component and a resistance component involves complicated procedures.

SUMMARY OF THE INVENTION

It is an object of the present invention to provide a method for grouping unit cells of a similar impedance spectrum using the pattern matching technology without any complex procedures; fitting the impedance spectra to a physically appropriate equivalent circuit model or separating the impedance measurements into a capacitance component and a resistance component in the analysis of impedance spectrum.

It is another object of the present invention to provide a method for grouping unit cells of a similar impedance spectrum using the pattern matching technology so as to optimize the performance of a battery pack made of the unit cells connected in series, in parallel, or in combination of them.

To achieve the objects of the present invention, there is provided method for grouping unit cells of a similar impedance spectrum to make an optimal battery pack, the method including: (a) measuring the impedance spectrum of the individual unit cell in a predetermined frequency region at the same temperature and in the same state of charge; (b) digitizing the difference of impedance spectrum among the unit cells into relative value using the pattern matching technology; and (c) selecting two or more unit cells having the smallest difference in the digitalized impedance spectrum.

The present invention is to analyze all the frequency regions of the measured impedance spectrum and to select the unit cells to make an optimal battery pack.

Also, the present invention is to select unit cells of a most similar internal characteristic using the pattern matching technology without a complicated process of fitting the impedance spectra to a physically appropriate equivalent circuit model or separating the impedance measurements into a capacitance component and a resistance component in the analysis of the impedance spectrums.

While other methods of selecting unit cells include analyzing a statistically significant number of unit cells before selecting unit cells and sorting unit cells according to this analysis result, the present invention only compares impedance spectra of the unit cells without a need of the analytical process and can be immediately applied to any kind of unit cells without a preliminary analysis.

The present invention is analyzing the impedance spectrum of electrochemical power sources, of which the measurement is an indirect and non-destructive way of determining the internal characteristic of the power sources, using the pattern matching technology and selecting the power sources of a most similar impedance spectrum, i.e., a most similar internal characteristic to make a battery pack. Thus, the present invention is more efficient than the real-time discharge method, which is a destructive test taking a long time in measurement, and more useful for grouping unit cells with good reliability and guaranteeing the performance of the battery pack, compared with the correlation method using parameters.

BRIEF DESCRIPTION OF THE DRAWINGS

Hereinafter, the present invention will be described in further detail by way of the accompanying drawings.

FIGS. 4a and 4b show an example of grouping fifty prismatic lithium-ion batteries, in which the relative differences in impedance spectrum among the batteries are calculated based on Euclidean distance and expressed in the matrix, thereby sorting the batteries in groups of two having a most similar impedance spectrum;

Figure 1:
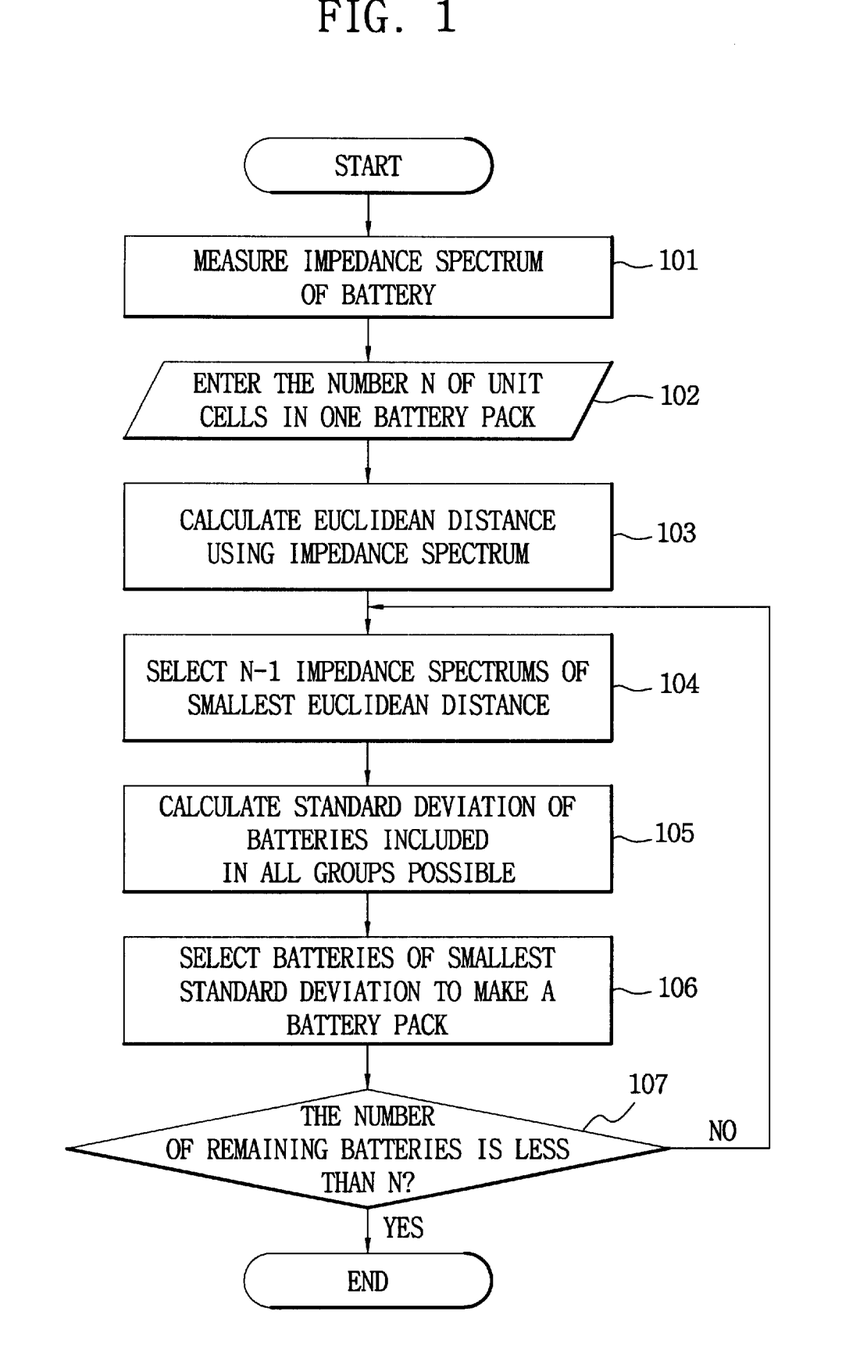
FIG. 1 is a flow chart showing the principle of a program for selecting N unit cells of a battery pack using the pattern matching technology.
Figure 2:
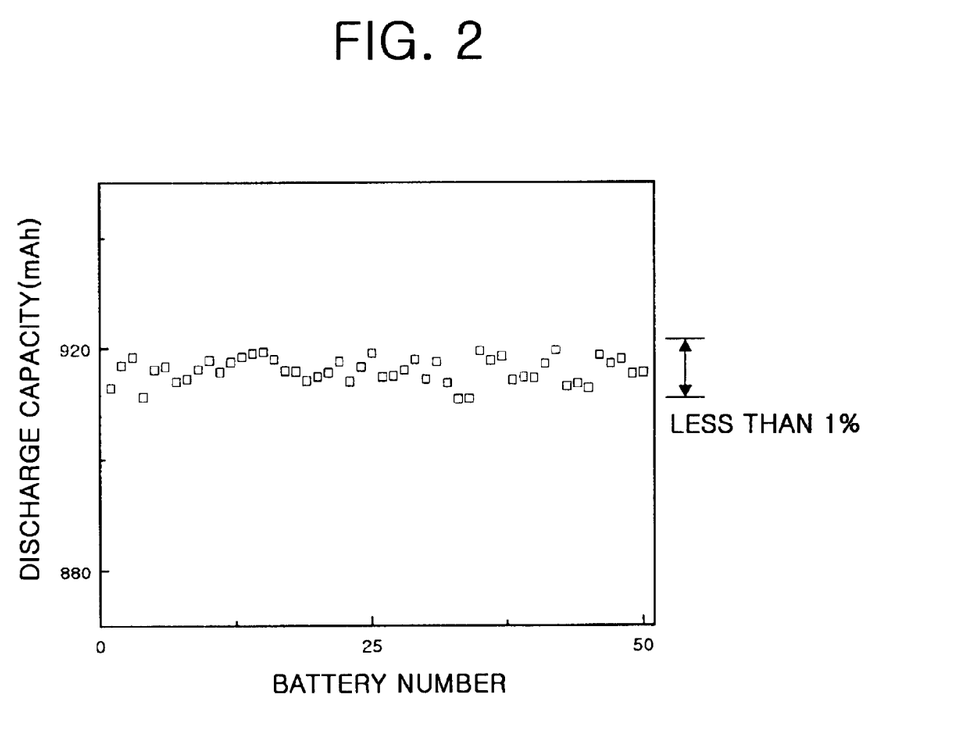
FIG. 2 is a graph showing a comparison of initial discharge capacity among fifty prismatic lithium-ion batteries.
Figure 3:
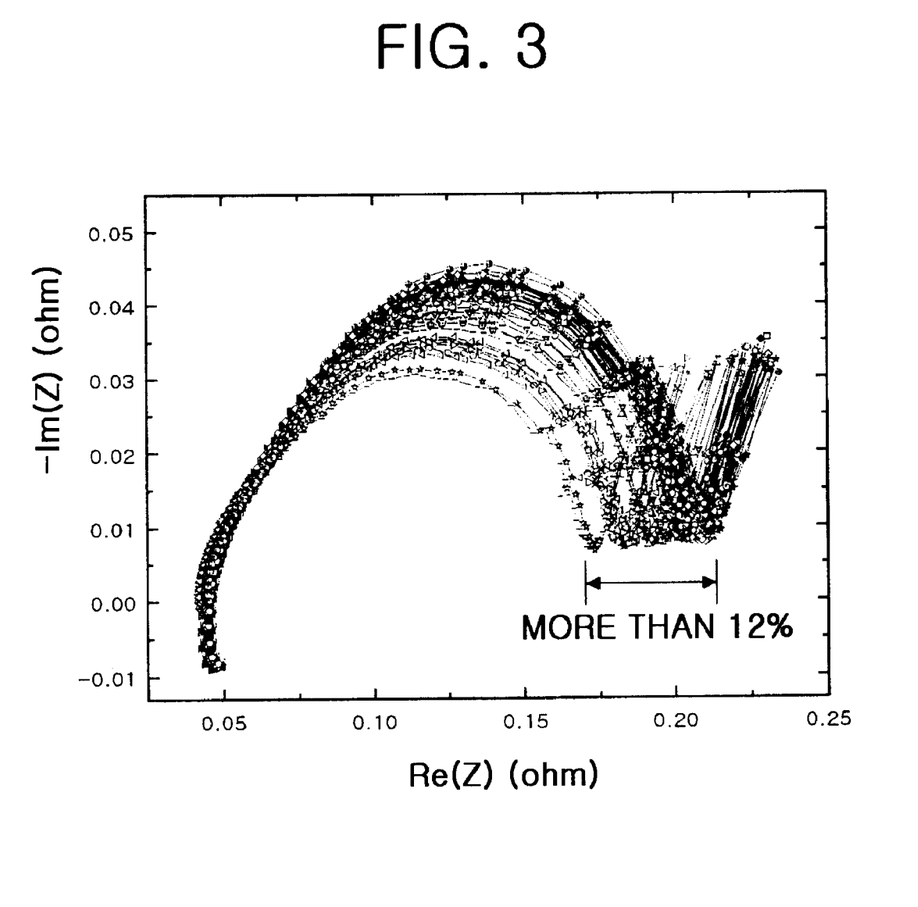
FIG. 3 is a graph showing a comparison of impedance spectrum in the frequency region from 10 mHz to 10 kHz among prismatic lithium-ion batteries, as measured at the same temperature and in the same state of charge.

DETAILED DESCRIPTION OF THE INVENTION (a) For fifty prismatic lithium-ion batteries produced by the same manufacturing process but having different performance characteristics, the complex impedance spectrum is measured at sixty different frequencies between 10 mHz and 10 kHz, in step 101. The measurement results are presented in FIG. 3. The impedance is measured with a battery diagnosis system (Powergraphy™, Model Name: BPS 1000FL) manufactured by Korea Kumho Petrochemical Co., Ltd. The fifty prismatic lithium-ion batteries used herein have different discharge capacity for the 1C discharge, the comparison of which is shown in FIG. 2. The measurement of impedance employs the method disclosed in U.S. patent application Ser. No. 09/746,452, which uses, for example, the multi-sine wave Fourier transformation impedance spectrum measurement or the transient response Laplace transformation impedance spectrum measurement.

(b) The number N of unit cells to make one battery pack is entered, in step 102. Subsequently, the similarity in impedance spectrum among the fifty prismatic lithium-ion batteries is calculated using the pattern matching technology, in step 103. One of the well-known pattern matching technologies is the distance measurement, the specific examples of which include the distance measurement between the curves based on Euclidean distance, square of Euclidean distance, and Manhattan distance. These measurements are used to determine the similarity of the impedance spectra. An example of the Euclidean distance measurement can be expressed by Equation 1 below, where $\Delta$ is the relative difference between two impedance spectra; $Z_1$ and $Z_2$ are two different impedance spectra, respectively; $Re(Z_1)$ is the real part of the impedance spectrum $Z_1$ and $Im(Z_2)$ is the imaginary part of the impedance spectrum $Z_2$; i is the total number of frequencies used for the measurement of impedance spectrum, and $f_i$ is the frequency used for the measurement of impedance spectrum:

$$\Delta = \sqrt{\sum_i [Re(Z_1(f_i)) - Re(Z_2(f_i))]^2 + \sum_i [Im(Z_1(f_i)) - Im(Z_2(f_i))]^2}$$ [Equation 1]

Following the calculation of Euclidean distance, N−1 impedance spectra with the smallest Euclidean distance are selected, in step 104. Then the standard deviations of the batteries included in all the possible groups are calculated, in step 105.

(c) The relative differences among the fifty impedance spectra obtained in the step (b) are expressed in a matrix so that the batteries are sorted in groups of two having a most similar impedance spectrum, as shown in the grouping example of FIG. 4. In the matrix of FIG. 4, the individual elements represent the Euclidean distance among the fifty impedance spectra according to Equation 1. This matrix is symmetric to the diagonal elements that are all zero. In the figure, only the one side to the diagonal elements is denoted, and the numbers in rows and columns are designated to identify the fifty batteries. This matrix shows all possible assortments of the batteries in groups of two and is thus useful to make a battery pack having more than two unit cells.

Figure 5:
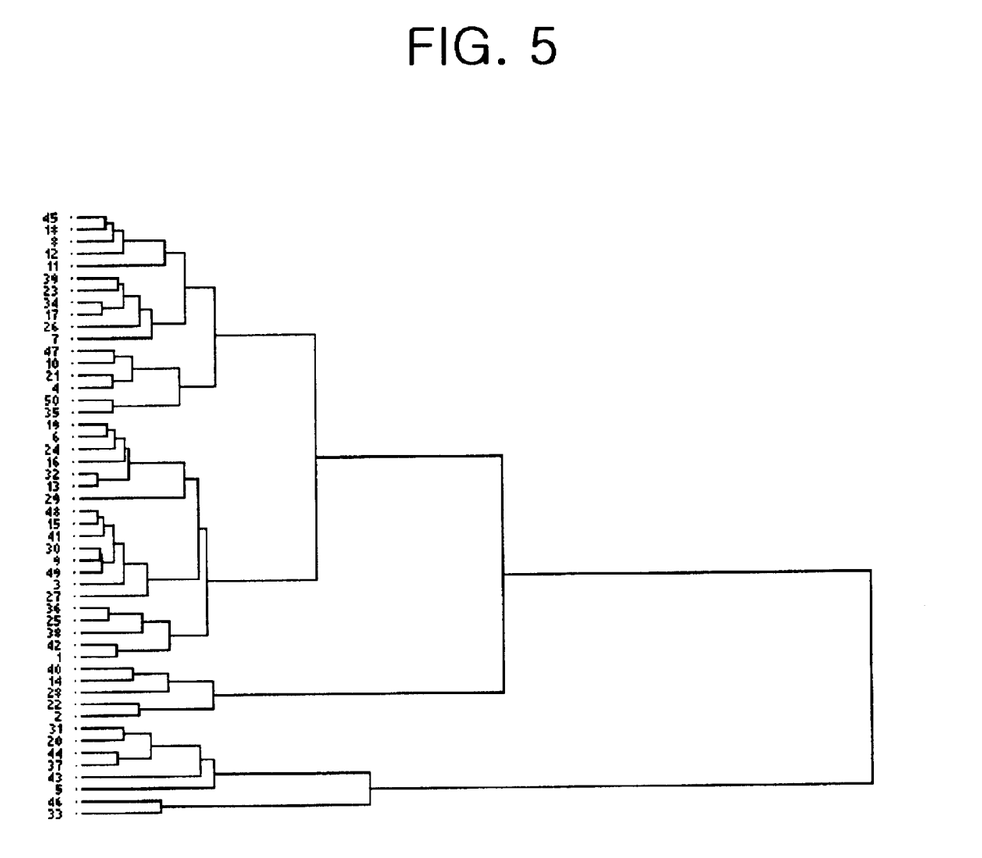
FIG. 5 shows an example of grouping fifty prismatic lithium-ion batteries, in which the differences in impedance spectrum among the batteries are calculated by the least square method and expressed in a dendrogram having a clustering-based tree structure so that the length of each branch represents the relative difference in impedance spectrum between two batteries.

FIG. 5 illustrates a dendrogram showing the differences in impedance spectrum among the fifty batteries obtained in the step (b) by a clustering-based pattern matching technology so that the length of each branch represents the relative difference of impedance spectrum between two batteries. The dendrogram of FIG. 5 has a tree structure showing the difference of impedance spectrum evidently among the batteries and allows the assortment of the batteries in several groups with the points in the hierarchy structure at which the upper branch forks into two lower branches.

Figure 6:
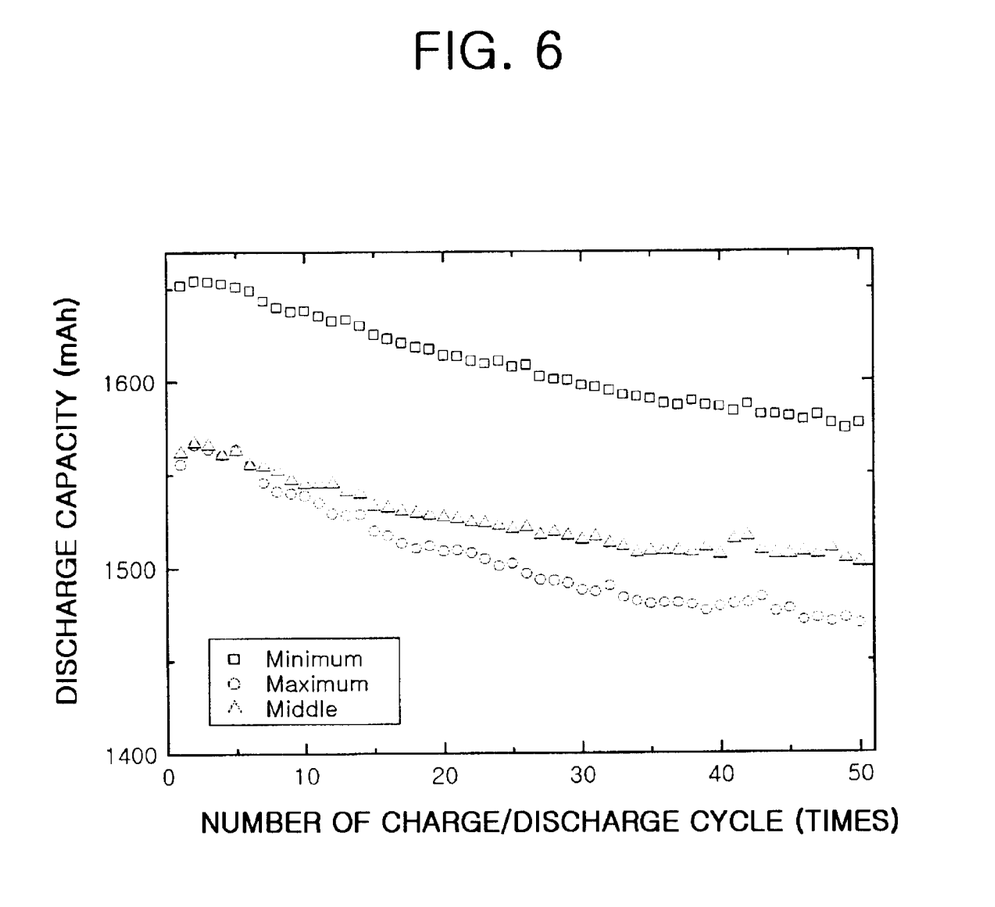
FIG. 6 is a graph showing a comparison of discharge capacity reduced according to the charge/discharge cycling among the battery packs having parallel connection of batteries grouped by the relative difference in impedance spectrum.
Figure 7:
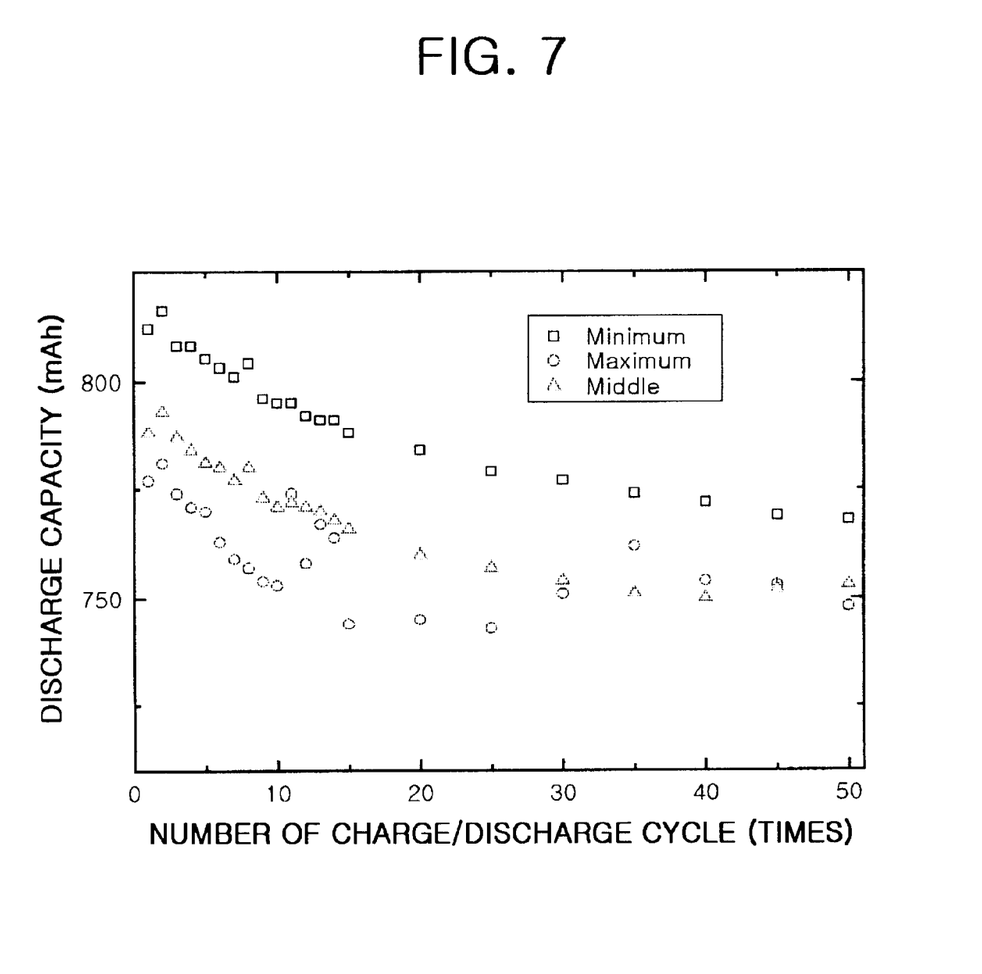
FIG. 7 is a graph showing a comparison of discharge capacity reduced according to the charge/discharge cycling among the battery packs having serial connection of batteries grouped by the relative difference in impedance spectrum.

(d) The groups of batteries having a smallest standard deviation of the impedance spectra are selected to make battery packs, in step 106. To demonstrate the efficiency of battery pack with batteries of a similar impedance spectrum, two batteries having the smallest standard deviation of impedance spectrum, two batteries with the largest standard deviation, and two batteries with in-between standard deviation are selected to make serial and parallel battery packs. Then, it is checked in step 107 if the number of the remaining batteries is less than the number N of the batteries used to make one battery pack as entered in step 102. If the number of the remaining batteries is greater than N, the procedure returns to step 104 to exam the impedance spectra to make the battery packs. Otherwise, the process of making battery packs ends. The three groups of battery packs are marked with "Minimum", "Maximum", and "Middle", respectively. The charge/discharge results of the serial and parallel battery packs sorted in three groups are presented in FIGS. 6 and 7, which show the battery packs of the Minimum group are superior in initial capacity and performance characteristic for continuous charge/discharge to those of the Maximum and Middle groups. The battery packs of the Maximum and Middle groups have similar performances, such as capacity or aging speed even though they differ from each other in the internal characteristic. This reveals that the performance of the battery pack is largely dependent upon the difference of the internal characteristic between the unit cells in the battery packs. Accordingly, it is most preferable to make a battery pack with unit cells having most similar internal characteristics, i.e., the smallest relative difference in impedance spectrum and thereby to reduce deterioration of the performance of the battery packs.

As described above, the present invention uses a pattern matching method to analyze the impedance spectrum of electrochemical power sources. It utilizes indirect and non-destructive test for determining the internal characteristic of the electrochemical power sources, such as impedance spectroscopy, to make a battery pack with the power sources of most similar impedance spectrum, i.e., most similar internal characteristics. Thus, the present invention is directed to a method that is more efficient than the real-time discharge method which is a destructive test taking a long time in measurement, and more useful for grouping unit cells with good reliability and guaranteeing the performance of the battery pack, compared with the correlation method using parameters, thereby enhancing the accuracy and reliability in predicting the internal characteristic of the power sources.

Furthermore, the present invention remarkably shortens the required time for the measurement and analysis of the power sources and allows the construction of a high-efficiency battery pack with the power sources.

While this invention has been described in connection with what is presently considered to be the most practical and preferred embodiment, it is to be understood that the invention is not limited to the disclosed embodiments, but is intended to cover various modifications and equivalent arrangements included within the spirit and scope of the appended claims.

What is claimed is:

1. A method for grouping unit cells, which is analyzing the impedance spectrum of the individual unit cells using a pattern matching technology and selecting cells of a similar impedance spectrum in groups to make an optimal battery pack, the method comprising:

(a) measuring the impedance spectrum of the individual unit cell in a predetermined frequency region at the same temperature and in the same state of charge;

(b) digitizing the difference in impedance spectrum among the unit cells into a relative value using the pattern matching technology; and (c) selecting two or more unit cells having the smallest difference in the digitalized impedance spectrum.

2. The method as claimed in claim 1, wherein the pattern matching technology in step (b) comprises using distance measurement between the impedance spectrums to determine similarity of the impedance spectra.

3. The method as claimed in claim 2, wherein the distance measurement between the impedance spectra comprises calculations of Euclidean distance, square of Euclidean distance or Manhattan distance.

4. A method for grouping unit cells, comprising:

(a) measuring complex impedance values of electrochemical power sources at different frequencies in a predetermined frequency region at the same temperature and in the same state of charge; the electrochemical power sources being produced by a same manufacturing process and having a different internal characteristic;

(b) calculating a similarity in impedance spectrum curves among the power sources measured in the step (a) using a pattern matching technology; and (c) selecting two or more electrochemical power sources having the similarity in impedance spectrum curves calculated in the step (b) and sorting them in groups of two or more to make an excellent battery pack.

5. The method as claimed in claim 4, wherein the electrochemical power sources comprise primary battery, fuel cell, secondary battery including lithium-ion battery, lithium-ion polymer, lithium polymer, NiCd, NiMH, or lead-acid battery.

6. The method as claimed in claim 4, wherein the measurement in step (a) comprises a multi-sine wave Fourier transformation impedance spectrum measurement.

7. The method as claimed in claim 4, wherein the measurement in step (a) comprises a transient response Laplace transformation impedance spectrum measurement.

8. The method as claimed in claim 4, further comprising:

(d) constructing a tree structure of the electrochemical power sources having the similarity in impedance spectrum using the pattern matching technology based on clustering.

9. The method as claimed in claim 8, wherein the power sources in a lower branch of the tree structure having a similar relative difference in impedance spectrum are sorted in a group for one battery pack.

10. The method as claimed in claim 4, wherein the pattern matching technology in step (b) comprises using distance measurement between the impedance spectra to determine similarity of the impedance spectra.

11. The method as claimed in claim 4, wherein the similarity of the impedance spectra are expressed in a matrix for comparison so as to determine a similarity in impedance spectrum among the power sources.

12. The method as claimed in claim 10, wherein the distance measurement between the impedance spectra comprises calculations of Euclidean distance, square of Euclidean distance or Manhattan distance.

* * * * *